United States Patent
Tobe et al.

[11] Patent Number: 6,091,179
[45] Date of Patent: *Jul. 18, 2000

[54] VIBRATION ACTUATOR DRIVE DEVICE AND METHOD OF USE

[75] Inventors: Michihiro Tobe, Kawasaki; Daisuke Saya, Chiba-ken; Tadao Takagi, Kanagawa-ken, all of Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/874,249

[22] Filed: Jun. 13, 1997

Related U.S. Application Data

[63] Continuation of application No. 08/554,940, Nov. 9, 1995, abandoned.

[30] Foreign Application Priority Data

| Nov. 9, 1994 | [JP] | Japan | 6-274773 |
| Nov. 9, 1994 | [JP] | Japan | 6-274925 |
| Apr. 5, 1995 | [JP] | Japan | 7-080397 |

[51] Int. Cl.$^7$ ................................................ H02N 2/04
[52] U.S. Cl. ................................... 310/328; 310/323
[58] Field of Search ............................ 310/323, 328, 310/316

[56] References Cited

U.S. PATENT DOCUMENTS

| 4,763,148 | 8/1988 | Takimoto et al. | 310/323 |
| 4,771,203 | 9/1988 | Mukohjima et al. | 310/323 |
| 5,039,899 | 8/1991 | Yamaguchi | 310/323 |
| 5,140,215 | 8/1992 | Yamaguchi | 310/323 |
| 5,146,129 | 9/1992 | Tamura et al. | 310/323 |
| 5,162,692 | 11/1992 | Fujimura | 310/323 |
| 5,172,023 | 12/1992 | Kawai et al. | 310/323 |
| 5,191,688 | 3/1993 | Takizawa et al. | 29/25.35 |
| 5,298,829 | 3/1994 | Tsukimoto et al. | 310/323 |
| 5,332,941 | 7/1994 | Honda | 310/323 |
| 5,352,950 | 10/1994 | Shirasaki | 310/323 |
| 5,416,375 | 5/1995 | Funakubo et al. | 310/323 |
| 5,506,762 | 4/1996 | Tamai et al. | 310/328 |
| 5,532,540 | 7/1996 | Claeyssen et al. | 310/323 |
| 5,548,175 | 8/1996 | Tamai | 310/323 |
| 5,565,726 | 10/1996 | Toda | 310/323 |
| 5,596,241 | 1/1997 | Seki et al. | 310/323 |
| 5,600,196 | 2/1997 | Tami | 310/323 |
| 5,665,918 | 9/1997 | Takano et al. | 310/323 |

FOREIGN PATENT DOCUMENTS

| 63-294269 | 11/1988 | Japan | H02N 2/00 |

OTHER PUBLICATIONS

"New Version of Ultrasonic Motor", pp. 161–165, Euha and Tomikawa, Trikeps (Japanese orginal; English translation attached).

"New Version of Ultrasonic Motor", pp. 101–114, Trikeps (Japanese orginal; English translation attached).

*Primary Examiner*—Thomas M. Dougherty
*Attorney, Agent, or Firm*—Oliff & Berridge, PLC

[57] ABSTRACT

A driving device is equipped with a vibration actuator. The vibration actuator includes a roller element, an elastic member and electro-mechanical converting elements, which contact the elastic member. The electro-mechanical converting elements generate a vibration to drive the elastic member. Additionally, the roller element transfers relative movement to at least one element to be moved by contacting a driving part of the vibration actuator and by rotating. The roller element comprising a first part contacting the at least one driving section of the elastic member and a second part, separate from the first part, contacting the at least one element. In operation, the at least one electro-mechanical converting element vibrates the at least one driving section of the elastic member. The at least one driving section transfers the vibration to the first part of the roller element to rotate the roller element and the least one element is moved by rotation of the second part of the roller element.

34 Claims, 11 Drawing Sheets

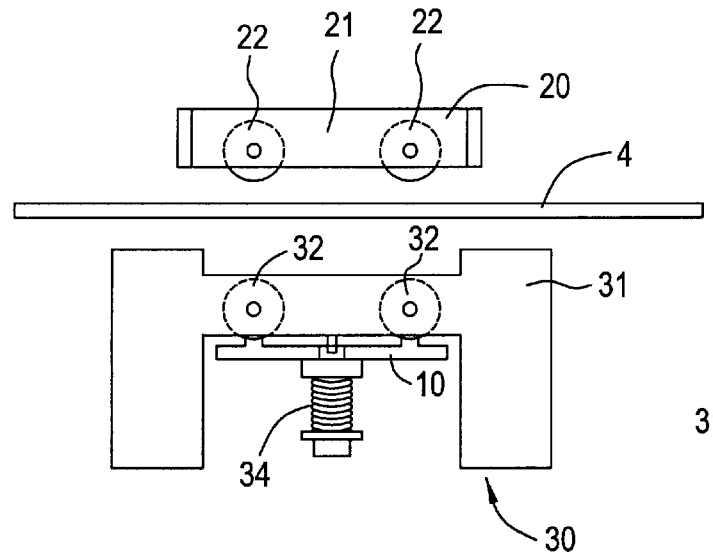 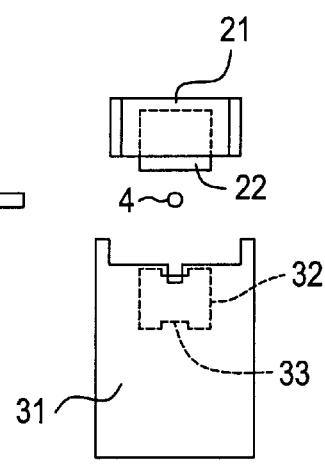
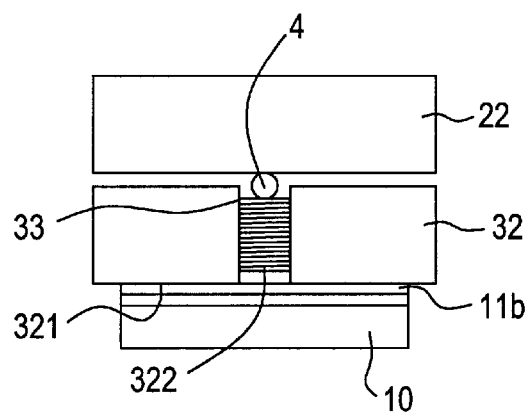 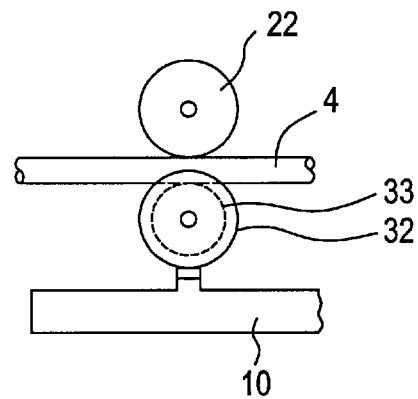
FIG. 1(A)   FIG. 1(B)
FIG. 2(A)   FIG. 2(B)

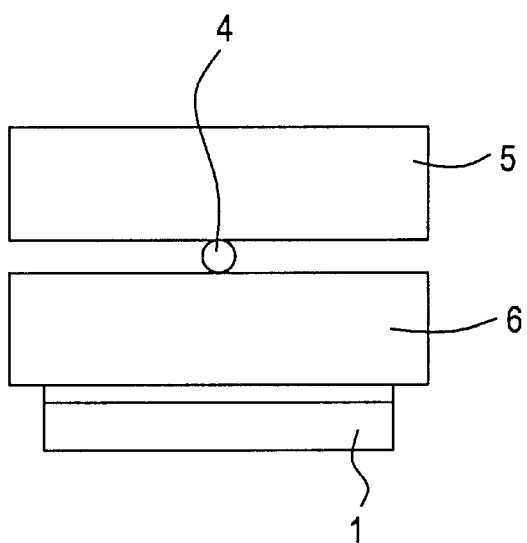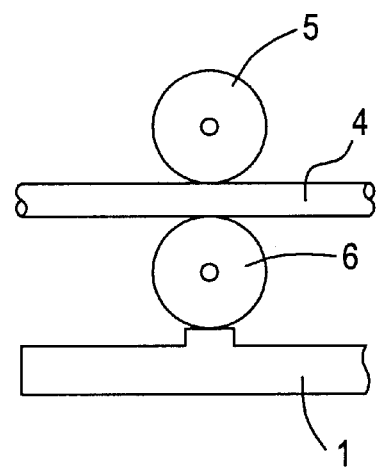
FIG. 13(A)
PRIOR ART
FIG. 13(B)
PRIOR ART

VIBRATION ACTUATOR DRIVE DEVICE AND METHOD OF USE

This is a Continuation of application Ser. No. 08/554,940 filed Nov. 9, 1995, now abandoned.

BACKGROUND OF THE INVENTION

1. Field of the Invention

The invention relates to a drive device that includes a vibration actuator. The drive device is capable of transporting linear, sheet or fiber like elements. The drive device can run by itself and be used as a "self-propelled device". A drive device, which is equipped with a vibration actuator, comprises an ultrasonic motor, and exhibits good controllability, a high durability and a quiet operation.

2. Description of the Related Art

Known vibration actuators can be divided into two main groups, a rotation actuator group and a linear actuator group. A rotation actuator can be used, for example, as a motor for a camera autofocus device.

FIG. 11 shows a drawing of a known linear vibration actuator. The linear vibration actuator includes a transformer 102, located at one end of a rod-shaped elastic member 101, to vibrate the elastic member 101. A second transformer 103 for controlling the vibrations is located at the other end of the rod-shaped elastic member 101. Vibration elements 102a and 103a are connected to transformers 102 and 103. An alternating voltage can be applied to the vibration element 102a to cause a vibration from the generator 102b to be transferred to the rod-shaped elastic member 101. The vibration is transformed into a travelling wave throughout the rod-shaped elastic member 101. An element to be moved 104 is placed on the rod-shaped elastic member 101, and moved by the travelling waves.

The vibration in the rod-shaped elastic member 101 is transmitted from the vibration element 103a through the transformer 103. The transformer 103 can control the vibration energy. The vibration energy is converted to electrical energy by the vibration element 103a. The electric energy is then consumed or absorbed by a load 103b that is connected to the vibration element 103a. Thus, a reflection of the wave at the edge surface of the rod-shaped elastic member 101 is controlled by the transformer 103 and the creation of standing waves in an intrinsic mode in the rod-shaped elastic member 101 is prevented.

The linear vibration actuator shown in FIG. 11 should have a length equal to that of the rod-shaped elastic member 101. Furthermore, it may be necessary to add vibrations to the rod-shaped elastic member 101 to move the element 104. Thus, a problem exists in that a transformer 103 is required for controlling vibrations, in addition to enlarging the device and preventing the creation of the standing waves.

In order to solve the above-noted problems, various types of vibration actuators have been proposed. For example, FIGS. 12(A)–12(C) are drawings showing a known longitudinal L1-bending B4 mode flat-plate motor 1', which can serve as an optic movement pick up. FIG. 12(A) is a front view, FIG. 12(B) is a side view and FIG. 12(C) is a planar view of the motor 1'.

The motor 1' includes an elastic member 1 comprising a rectangular flat plate shaped base part 1a and projected parts 1b and 1c, which are formed on one surface of the base part 1a. Piezoelectric members 2 and 3 comprise electro-mechanical converting elements and are attached to the other surface of the base part 1a of the elastic member 1. The electro-mechanical converting elements 2 and 3 create the longitudinal vibration and the bending vibrations on the surface of the elastic member 1.

The projected parts 1b and 1c are located at an antinode position of the bending vibration, that is generated in the base part 1a. The projected parts 1b and 1c contact an element to be moved (not shown), such as, for example, a guide rail and the like.

Further, a vibration actuator using a double mode bending vibration element has been known for use as a card transfer or paper feeding devices. See "New Version of Ultrasonic Motor," by Ueha and Tomikawa, published by Trikeps, pp. 161–165. With a card transfer or paper feeding device, a roller is rotated using an ultrasonic or vibration actuator. Cards or paper that contact the roller are moved by the actuator. However, if a round rod-shaped linear element is attempted to be moved by the vibration actuator of FIG. 12, problems arise.

FIGS. 13(A) and 13(B) illustrate the some of the above-noted problems. FIGS. 13(A) and 13(B) are drawings showing a roller element of a known driving device, using the vibration actuator of FIG. 12. In the driving device, a lower section of a roller 6 contacts the elastic member 1 and an element 4 to be moved, for example either a linear or sheet element. However, if a coefficient of friction for the surface of the roller 6 contacting the elastic member 1 differs from the coefficient of friction for the surface of the roller 6 contacting the element 4, efficient driving of the linear element 4 is not possible.

Additionally, if foreign matter adheres on the linear element 4, the foreign matter may enter the space between the roller 6 and the elastic member 1. Thus, the surface of the roller 6 has an increased friction, which reduces the durability of the lower section of the roller 6. Further, the driving efficiency is reduced and, in a worse case scenario, the roller 6 may not be able to be rotate. Additionally, the drive surface may be damaged by the foreign matter.

Where the element 4 is linear and driven by cylindrical rollers 5 and 6, the linear element 4 may slip sideways toward the advancing direction and against a lower section of the roller 6. Furthermore, in a worst case scenario, the linear element 4 may be become derailed from the lower section of the roller 6.

SUMMARY OF THE INVENTION

One object of this invention is to provide a driving device that is equipped with a vibration actuator having an increased efficiency for moving an element, such as linear elements. Another object of the invention is to improve a drive roller's durability in a drive device, which is equipped with a vibration actuator. A further object of the invention is to prevent derailing of element from a drive roller during the operation of a drive device that is equipped with a vibration actuator.

In order to obtain the objects described above, a driving device is equipped with a vibration actuator. The vibration actuator includes a roller element, an elastic member and electro-mechanical converting elements, which contact the elastic member. The electro-mechanical converting elements generate a vibration on the elastic member. Additionally, the roller element transfers movement to elements to be moved by contacting a driving part of the vibration actuator. The roller element includes a first part, which contacts the driving part, and a second part, which contacts the element to be moved. It is possible to provide the first and second parts of the roller with different surfaces to increase frictional contact therebetween.

Additionally, the above and other objects can be achieved by providing a diameter of the second part of the roller smaller than a diameter of the first part. Further, the second part of the roller can form a groove to assist retaining the element to be moved.

Further, the diameter of the second part of the roller can be larger than that of the first part, and the second part can be formed as a wheel. The second part can be positioned on both sides of the first part, and the vibration actuator can be placed between the second parts. Alternatively, the first part may be alternatively positioned on both sides of the second part of the roller element, and the vibration actuator can be placed between the first parts.

To achieve the above and other objects, the roller can have different surface roughnesses for the parts contacting the element to be moved and the parts contacting the driving part of the vibration actuator. The surface roughness of the second part can be larger than the surface roughness of the first part. Alternatively, the roller can have coefficients of friction for the parts contacting the moving element and the parts contacting the driving part of the vibration actuator that are different.

Further, the above and other objects can be achieved by providing the roller having different materials for the parts contacting the vibration actuator and element to be moved. Moreover, a second roller can be used and placed so the element to be moved is held by the second part of the roller element and the second roller, wherein the second roller can be made from the same material as said roller by making both with the same material. Further, the selection of the appropriate materials for each of the components increase the operational efficiency of the drive device.

Other objects, advantages and salient features of the invention will become apparent from the following detailed description, which, taken in conjunction with the annexed drawing, discloses preferred embodiments of the invention.

BRIEF DESCRIPTION OF THE DRAWINGS

The invention will be described in detail with reference to the following drawings, in which like reference numerals refer to like element and wherein:

FIGS. 1(A) and 1(B) show a first preferred embodiment of the driving device having the vibration actuator;

FIGS. 2(A) and 2(B) are drawings showing the roller section extracted from the driving device in FIG. 1;

FIGS. 13(A) and 13(B) are drawings showing a known roller element of a driving device used in the vibration actuator shown in FIG. 12.

DETAILED DESCRIPTION OF PREFERRED EMBODIMENTS

Figure 3A:
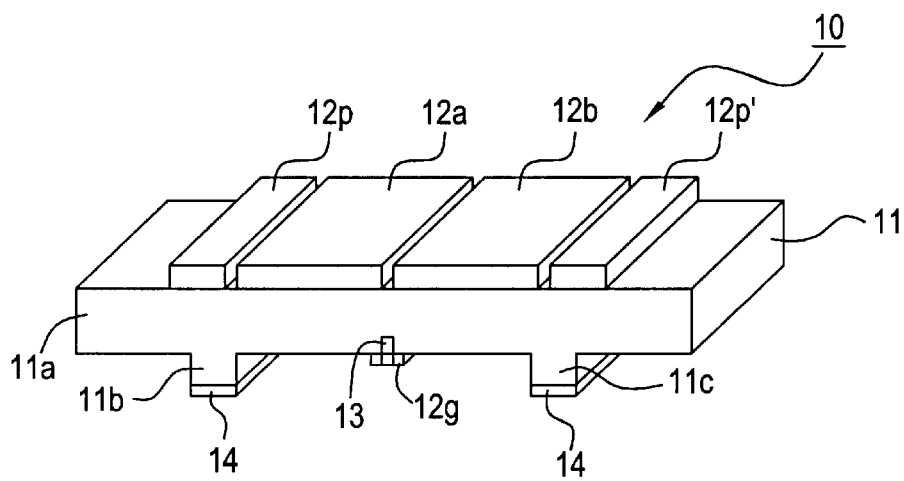
FIGS. 3(A) and 3(B) are drawings showing the vibration actuator.

FIG. 1(A) and 1(B) show a first preferred embodiment of the driving device having a vibration actuator. FIG. 1(A) is a front view and FIG. 1(B) is the side view of the driving device.

The driving device of FIGS. 1(A) and 1(B) comprises a vibration actuator 10, an upper section roller block 20 and a lower section roller block 30. The upper section roller block 20 includes an upper section roller 22, which is rotatably supported on a frame member 21. The lower section roller block 30 includes a lower section roller 32, which is rotatably supported on a frame member 31.

FIGS. 1(A) and 1(B) show the upper section roller block 20, element 4, which is a linear element to be moved, and the lower section roller block 30 in a spaced relationship. However, in use, the element 4 contacts the upper and lower rollers 22 and 32, respectively.

FIGS. 2(A) and 2(B) show the vibration actuator 10, the upper section roller 22, the linear moving element 4 and the lower section roller 32, being extracted from the driving device of FIGS. 1(A) and 1(B). The lower section roller 32 includes a lower roller section 321, contacting the vibration actuator 10, and a second lower roller section part 322, contacting the linear moving element 4.

The contact surface, between the first lower roller section part 321 and the vibration actuator 10, effectively transmits a driving force to the lower section roller 32. The driving force is formed in extremely minute elliptic motions, which are generated in the driving sections 11b and 11c of the vibration actuator 10. Thus given the contact of the components, the coefficient of friction of the contact surfaces and any contamination of contact surfaces can affect the driving efficiency. In a worst case scenario, the coefficient of friction and contamination of the surfaces can prevent moving of the element 4.

The contact surface, between the second lower roller section part 322 at the bottom section of a grooved section 33 and the linear element 4, effectively transmits a rotational force from the lower roller 32 to the linear moving element 4. Again, the coefficient of friction and any contamination on these surfaces can affect the driving efficiency, for the reasons discussed above.

Therefore, the choice of material for the first lower roller section 321, which contacts the vibration actuator 10, and the second lower roller section 322, which contacts the linear moving element 4, is important. The material of the first and second lower roller sections 321 and 322, respectively are preferably different. The coefficient of friction of both contacting surfaces can be different materials, therefore, improving the driving efficiency of the driving device and the durability of the lower section roller 32.

The materials that form the first lower roller section 321 and the second lower roller section 322 of the lower section roller 32 can be selected as described below.

(1) Where the driving section of the vibration actuator 10 is made of a high rigidity metallic material, such as, for example, stainless steel, elinver (Fe base alloy containing 36 weight percent of Ni), or a carbon tool steel and the like, the first lower roller section 321 that contacts the driving section can be formed from a composite material. The composite material should contain at least one material or ceramic selected from the group consisting of: polyoxymethylene (POM), polyphenylene sulfide (PPS), polytetrafluoroethylene (PTFE), polyetheretherketone (PEEK) and nylon. These materials can be used individually or in a combination.

(2) Where the first lower roller section 321 of the lower section roller 32 is made of a high rigid metal material, such as, for example, as described above in (1), the driving section of the vibration actuator 10 that contacts the first lower roller section 321 can be formed from a composite material. The composite material should contain at least one material or ceramic selected from the group consisting of: polyoxymethylene (POM), polyphenylene sulfide (PPS), polytetrafluoroethylene (PTFE), polyetheretherketone (PEEK) and nylon. These materials can be used individually or in a combination.

(3) Where the linear moving element 4 is formed from relatively low rigidity polymeric materials, such as, for example: nylon; chloroethene; phenol; or urethan resin and the like, the second lower roller section 322 that contacts the linear moving element 4 can be formed from a composite material. The composite material should contain at least one material including polymeric materials, such as, for example selected from the group consisting of: polyoxymethylene (POM); polyphenylene sulfide (PPS); polytetrafluoroethylene (PTFE); polyetheretherketone (PEEK); nylon; urethan resin; phenolic resin; polycarbonate; bismaleimide triazine and the like.

Moreover, to reduce the abrasion of the second lower roller section 322 that contacts the linear moving element 4, the second lower roller section 322 can be formed from a composite material that improves sliding characteristics and reduces the friction. The composite material contains at least one material such as, for example selected from a group consisting of: polytetrafluoroethylene (PTFE); polyamide; polyimide; polyoxymethylene (POM); or polyphenylene sulfide (PPS) and the like.

Further, to increase the driving force, the second lower roller section 322 can be formed from a composite material that contains at least one material such as, for example, selected from the group consisting of: a rubber material, i.e., isoprene rubber; urethan rubber; ethylene rubber; propylene rubber; chloroprene rubber; natural rubber; or butyl rubber and the like; and a polymeric material, such as, for example: polyetheretherketone (PEEK) or bismaleimide triazine and the like. These materials, can be used in individually or in a combination.

(4) Where the linear moving element 4 is made from a relatively low rigidity composite material containing at least one material selected from the group consisting of: a rubber material; polyoxymethylene (POM); polyphenylene sulfide (PPS); polytetrafluoroethylene (PTFE); polyetheretherketone (PEEK); and nylon, the second lower roller section 322 that contacts the element 4 should be formed from a composite material, for example, such as selected from the group consisting of: a polymeric material, such as; nylon; chloroethene; phenol; or polycarbonate and the like.

(5) Where the linear moving element 4 is formed of metallic material having a high rigidity, it is possible to form the second lower roller section 322 that contacts the element 4 from low coefficient of friction material and thus have a superior sliding property. These materials are, for example, selected from the group consisting of: polytetrafluoroethylene (PTFE); polyamide; polyimide; polyoxymethylene (POM); or polyphenylene sulfide (PPS) and the like.

Additionally, to increase the driving force, the second lower roller section 322 that contacts the element 4 can be formed from a polymeric material selected from a group of rubber materials. For example, the group can comprise: isoprene rubber; urethan rubber; ethylene rubber; propylene rubber; chloroprene rubber; natural rubber; or butyl rubber and the like. Alternatively, the element 4 can be formed from a polymeric material such as, for example, selected from the group consisting of: polyetheretherketone (PEEK); bismaleimide triazine; urethan resin; phenolic resin and the like. These materials can be used alone or in combination.

Further, when the first lower roller section part 321 and the second lower roller section 322 are formed from the materials described above, the entire roller 32 can be formed from the specified material. Alternatively, only the surface of the roller 32 need be formed from the above-described materials. If only the surface of the roller 32 is formed from these materials, the surface of the roller 32 can be coated, by for example adhesion or other suitable coating method.

If the materials for the first lower roller section part 321 and the second lower roller section 322 are different, the driving efficiency of the driving device can be improved by selecting suitable materials for the contacting surfaces. Additionally, contamination on the contacting surfaces can be prevented and durability of the roller 32 improved by selecting suitable materials.

The roller 32 includes a groove part 33 at the center section in a lengthwise direction, as seen in FIGS. 1(B) and 2(B). The groove part 33 has a depth less than the diameter of a linear moving element 4. Thus, the element 4 can touch the bottom of the groove part 33. The sides of the groove part 33 prevent horizontal slippage of the element 4. Additionally, the groove part 33 separates the first lower roller section part 321, which contacts the vibration actuator 10, from the second lower roller section 322, which contacts the linear moving element 4.

As described above, the contacting surface 321 should effectively transmit a driving force from the vibration actuator 10 to the lower section roller 32 via an elliptic motion of the actuator 10. Therefore, the selection of material for the first lower roller section 321 is important to effectively transmit the driving force. Further, the surface of the first lower roller section 321 can be made roughened for effectively transmitting of the driving force and movements.

Additionally, the groove part 33 should effectively transmit a force from the lower section roller 32 to the linear moving element 4. Therefore, the coefficient of friction of the groove part 33, with respect to the element 4, should effectively transmit the force. Also, the second lower roller section 322 surface can be roughened to increase the surface roughness of the groove part 33, by machining for example, by knurling the roller's finish, by applying a coarse file to the bottom section or the like.

If the linear moving element 4 is covered with a resin, the coefficient of friction of the groove part 33 can be increased by adhering rubber or the like to the groove part 33. Alternatively, it is possible to coat a rubber-like layer on the bottom section of the groove part 33 to increase the coefficient of friction.

The driving section of the vibrational actuator 10 can be constructed from a composite material. The composite material can be selected from the group consisting of: resin; lubricant material; or inorganic material, and a material having superior low friction properties, such as, for example, PTFE as a resin, molybdenum disulfide as a lubricant and glass fiber as an inorganic material. The roughness of the first lower surface section 322 can be reduced by polishing.

Figure 3B:
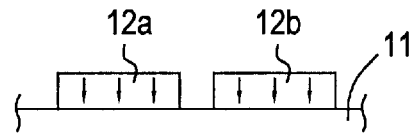

FIGS. 3(A) and 3(B) show the vibration actuator 10 in the driving device, according to the first preferred embodiment of the invention. The vibration actuator 10 comprises the elastic member 11, five piezoelectric members 12a, 12b, 12g, 12p, and 12p', which are connected to the elastic member 11, and a low friction sliding material 14. The vibration actuator 10 includes driving force takeoff projected sections 11b and 11c. As seen in FIG. 3, the sections 11b and 11c are connected to a low friction sliding material 14.

The elastic member 11 includes a flat plate shaped base section 11a and the projected driving sections 11b and 11c. The projected driving sections 11b and 11c are located on the undersurface of the base section 11a. The driving sections 11b and 11c are located at the antinode section of the largest amplitude of a bending vibration that is generated during operation (as described hereinafter).

The piezoelectric members 12a and 12b comprise electromechanical converting elements, which convert the electric signals into mechanical movements or displacements. The displacements take the form of longitudinal and bending vibrations that are transmitted to the elastic member 11 by an electrical current voltage, with a 90° phase difference. The longitudinal and bending vibrations generate an elliptic motion at the driving sections 11b and 11c of the elastic member 11.

The piezoelectric member 12g is electrically connected to the elastic member 11 via a conductive layer or coating 13. The piezoelectric member 12g is also connected to an electric ground potential.

The piezoelectric members 12p and 12p' constitute mechano-electro converting elements, which change mechanical movements or displacements into electrical signals. The electrical signals monitor the vibrational state in the elastic member 11 and output data to the control circuit 45, as described hereinafter. Additionally, the low friction sliding material 14 is connected to the edge surfaces of the driving sections 11b and 11c. As described above, the sliding material is a composite material made of for example, PTFE, molybdenum disulfide and glass fiber.

Figure 4:
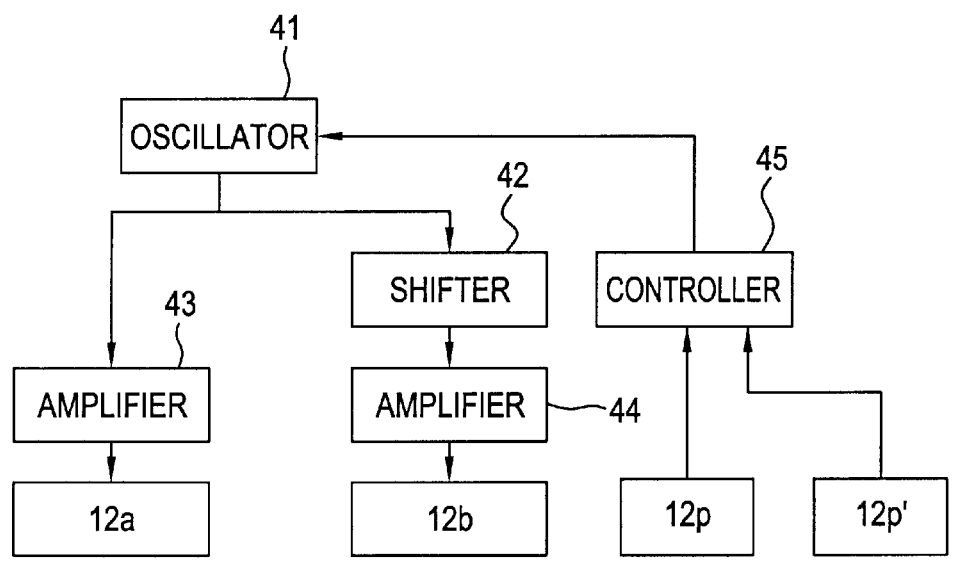
FIG. 4 is a block drawing showing the driving circuit for the vibration actuator of FIG. 3.
Figure 5D:
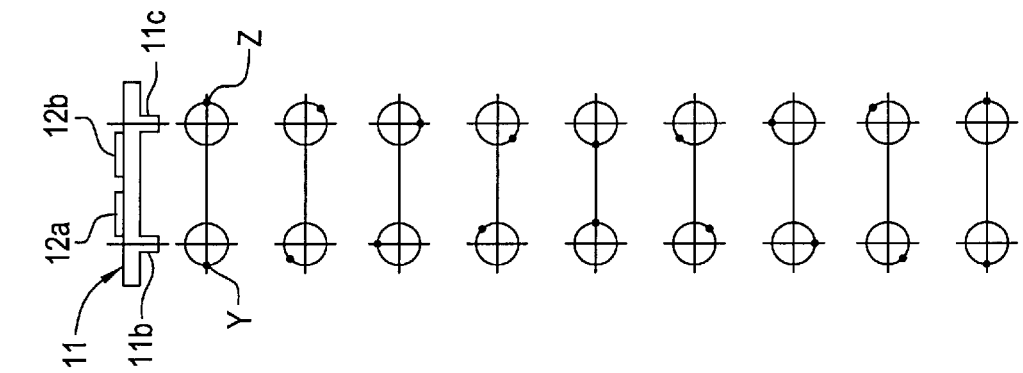
FIG. 5 is a drawing showing the driving operation of the vibration actuator.
Figure 5C:
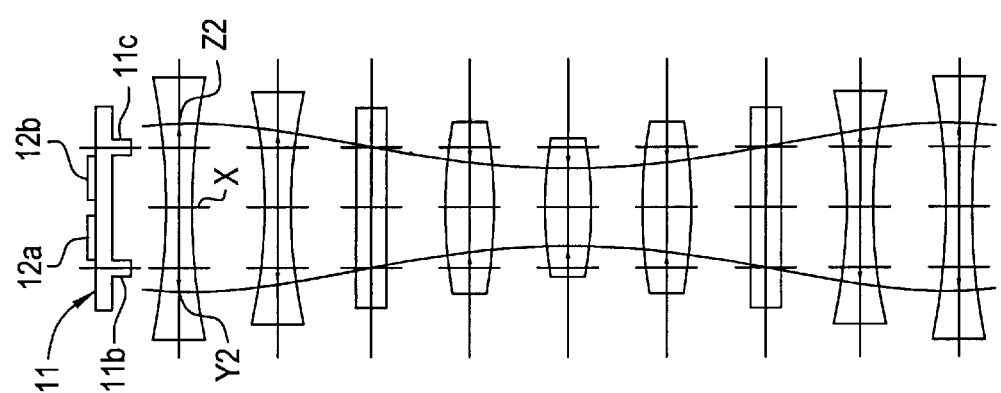
Figure 5B:
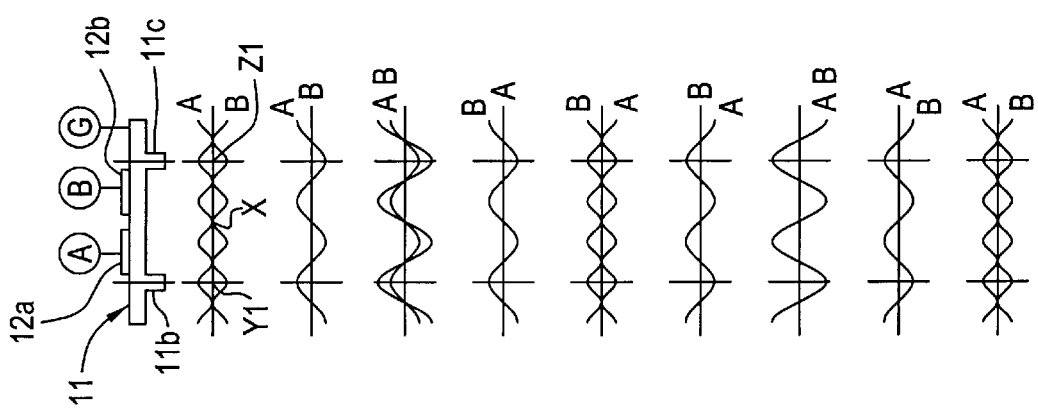
Figure 5A:
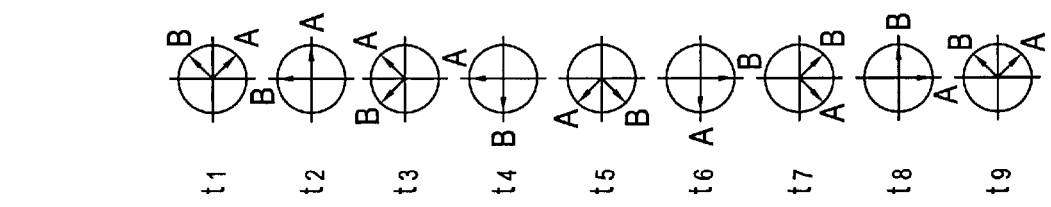

FIG. 4 is a block diagram showing the driving circuit for the vibration actuator of FIG. 3(A). An oscillator 41 emits signals at a frequency equivalent to a first longitudinal vibration mode and to a fourth bending vibration mode. The vibration actuator includes the elastic member 11 and the piezoelectric members 12a–12p'. The output of the oscillator 41 is split into two outputs. One output is amplified by the amplifier 43 and input to the piezoelectric member 12a, as phase voltage A. The other branched output is input into a phase shifter 42, which displaces the phase of the input by π/2. The phase shifted output is then input to the piezoelectric member 12b, as phase voltage B, via an amplifier 44.

The output voltages of the piezoelectric members 12p and 12p' are input to a controller 45. The controller 45 compares inputted voltages with pre-set voltage(s). When the output of the piezoelectric members 12p and 12p' is smaller than the pre-set voltage(s), the oscillator 41 sets the frequency to a low setting. When the output of the piezoelectric members 12p and 12p' is larger than the pre-set voltage(s), the oscillator 41 sets the frequency to a high setting. This maintains the vibrational amplitude of the vibration actuator at a designated magnitude.

In the illustrated embodiment, the controller 45 is implemented as a single special purpose integrated circuit (e.g., ASIC) having a main or central processor section for overall, system-level control, and separate sections dedicated to performing various different specific computations, functions and other processes under control of the central processor section. It will be appreciated by those skilled in the art that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the circuitry shown in FIG. 4 can be used as the controller. As shown, a distributed processing architecture is preferred for maximum data/signal processing capability and speed.

FIG. 5 is a drawing showing the movement of the vibration actuator 10 of FIG. 3(A). In the vibration actuator 10, current voltages in phases that differ by 90°, are added to each of the piezoelectric members 12a and 12b and are combined as a vibration. The combined bending vibration and longitudinal vibration is then transmitted to the elastic member 11. This generates an elliptic motion of the driving sections 11b and 11c.

Further, additional pressure can be added to the elastic member 11 by a pressure adding element 34, shown in FIG. 1(A). The pressure adding element 34 is attached to the same surface of the elastic member 11 as piezoelectric members 12a and 12b, respectively. The driving sections 11b and 11c contact with the lower section roller 32 to obtain the driving force.

The piezoelectric members 12a and 12b, as shown in FIG. 3(B), are polarized, so the polarity of each has the same direction. The high frequency voltages A and B from the amplifiers 43 and 44 are added to the piezoelectric members 12a and 12b, respectively. The high frequency voltages A and B have a phase difference of π/2. Alternatively, the polarization of these two piezoelectric members 12a and 12b can be in opposite directions.

Column (A) of FIG. 5 shows the amplitude changes of the high frequency voltages A and B input to the vibration actuator 10, at times $t_1$–$t_9$, where the horizontal axis represents the amplitude. Column (B) of FIG. 5 shows the cross section of the vibration actuator 10 and changes in the vibration curves generated in the vibration actuator 10. Column (C) shows a cross section of the vibration actuator 10 and changes in the longitudinal vibration generated in the vibration actuator 10. Column (D) shows changes in the elliptic motion generated in the driving sections 11b and 11c.

The vibration actuator 10 generates an elliptic motion at the ends of the driving sections 11b and 11c from the movement of mass points Y and Z. Therefore, if the ends of the driving sections 11b and 11c are pressed against the roller 32, the roller 32 rotates as a result of the transfer of forces.

The movement of the vibration actuator will be explained for times $t_1$–$t_9$.

As shown in column (A) of FIG. 5, the high frequency voltage A is a positive voltage at time $t_1$, and the high frequency voltage B is an equal, but out of phase, positive voltage. As shown in column (B), the bending movement induced by the high frequency voltages A and B offset each other. Thus, the amplitude at mass points Y1 and Z1 is 0. In addition, as shown in column (C), a longitudinal vibration is generated by the high frequency voltages A and B in the elongate direction of the elastic member 11. In column (C), the mass points Y2 and Z2 are shown with arrows and the largest elongation is centered at node X. Therefore, as shown in column (D), when both vibrations are combined, the movement between the mass points Y1 and Y2 equals the movement of mass point Y. Similarly, the movement between the mass points Z1 and Z2 equals the movement of mass point Z.

At time $t_2$, the high frequency voltage B becomes 0, as shown in column (A). The high frequency voltage A is a positive voltage. As shown in column (B), the movement induced by the high frequency voltage A causes the mass point Y1 to move in a positive direction and mass point Z1 move in a negative direction. Additionally, as shown in column (C), the longitudinal vibration generated by the high frequency voltage A causes the mass points Y2 and Z2 to be reduced from time $t_1$. As a result, as shown in column (D), the mass points Y and Z move clockwise from their positions at time $t_1$.

At time $t_3$, the high frequency voltage A is a positive voltage, as shown in column (A). The high frequency voltage B is an equivalent negative voltage. As shown in column (B), the movement induced by the high frequency voltages A and B cause the mass point Y1 to move in a positive direction, when compared to time $t_2$. Further, the mass point Y1 is at its largest plus amplitude at time $t_3$. The movement causes the mass point Z1 to move in a negative direction, when compared to time $t_2$. Further, the mass point Z1 is at its largest minus amplitude at time $t_3$. Additionally, as shown in column (C), the longitudinal vibrations induced by the high frequency voltages A and B are offsetting. Thus, mass points Y2 and Z2 return to their original positions. As shown in column (D), when both vibrations are combined the mass points Y and Z move clockwise from time $t_2$.

As shown in column (A), the high frequency voltage A is 0 at time $t_4$. The high frequency voltage B is a negative voltage at time $t_4$. As shown in column (B), the bending movement, which is induced by the high frequency voltage B, reduces mass point Y1 when compared to time $t_3$. The mass point Z1 is also reduced when compared to time $t_3$. Additionally, as shown in column (C), the longitudinal vibrations induced by the high frequency voltage B cause the mass points Y2 and Z2 to be reduced. As a result, as shown in column (D), both vibrations combine and the mass points Y and Z move clockwise from time $t_3$.

At time $t_5$, as shown in column (A), the high frequency voltage A is a negative voltage. The high frequency voltage B is an equivalent negative voltage, but out of phase $\pi/2$. As shown in column (B), the movement induced by the high frequency voltages A and B offset. The mass points Y1 and Z1 thus become 0. Additionally, as shown in column (C), the longitudinal vibration, which is induced by the high frequency voltages A and B, is generated and causes contraction of the elastic member. The mass points Y2 and Z2, as indicated by arrows, are at their maximum contraction around the node X at time $t_5$. As a result, as shown in column (D), the mass points Y and Z move clockwise from time $t_4$.

The bending and longitudinal vibrations are generated at times $t_6$ to $t_9$ in the same manner as described above. As shown in column (D), the mass points Y and Z move clockwise for times $t_6$ to $t_9$.

Figure 6:
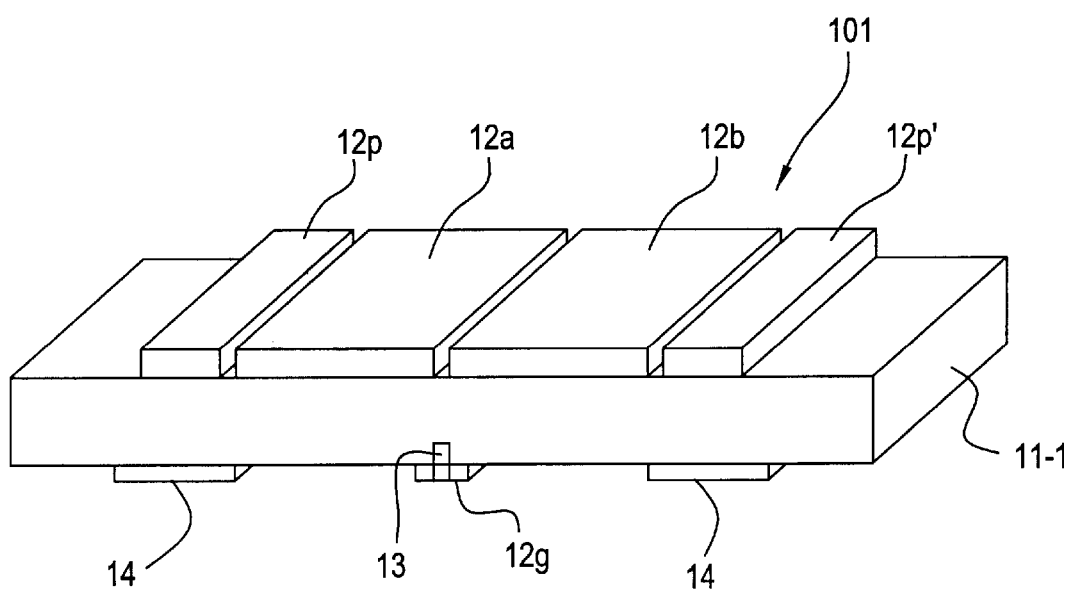
FIG. 6 is a drawing showing a driving device according to a second preferred embodiment.

FIG. 6 shows a vibration actuator in a driving device, according to a second preferred embodiment of the invention. In the second preferred embodiment and in the other preferred embodiments described hereinafter, similar reference numerals are used to represent like elements. Further, a description of the elements previously described will be omitted to avoid redundant explanations.

In FIG. 6, the projected driving sections 11b and 11c are omitted from the vibration actuator 101. A low friction sliding material 14 is adhered to the elastic member 111 where the bending vibration antinode is located, where the projected driving sections 11b and 11c would have located. With the elastic member 111 constructed according to the second preferred embodiment, the shapes of the actuator 101 and elastic members 111 are simplified. Therefore, it is possible to reduce the overall cost of the driving device, which is advantageous.

Figures 7A, 7B:
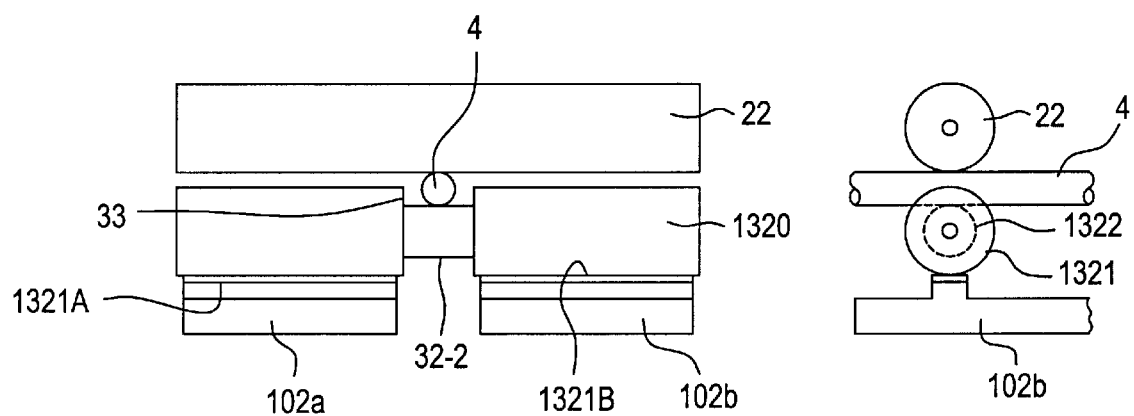
FIGS. 7(A) and 7(B) are drawings showing a third preferred embodiment of the driving device.

FIGS. 7(A) and 7(B) show a third preferred embodiment of the invention. FIG. 7(A) is a front view and FIG. 7(B) is a side view of the driving device. The driving device of the third preferred embodiment has, two vibration actuators 102a and 102b, which drive a roller 1320. The output from vibration actuators 102a and 102b, is transmitted to the roller sections 1321A and 1321B of the roller 1320. An element 4, such as a linear element, is driven by contacting a connecting axis part 1322 of the roller 1320. The connecting axis part 1322 has a small diameter and connects the larger diameter roller sections 1321A and 1321B together.

According to this third preferred embodiment, the driving section of the vibration actuator is divided into two vibration actuators 102a and 102b. Thus, the contact area of the lower section roller 1320, and the vibration actuator 102 is increased. A larger driving force can be obtained. Additionally, the connecting part 1322 is stepped to prevent horizontal displacement of the linear moving element 4. Further, the vibration actuators 102a and 102b can be provided on two pieces, as shown, or alternatively, on more than two pieces.

Figure 8A:
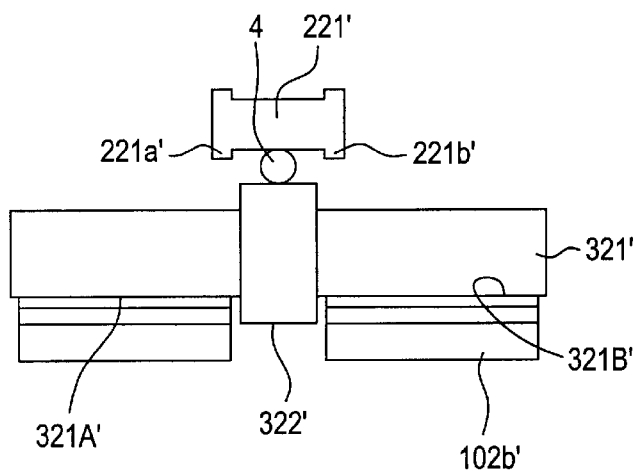
FIGS. 8(A) and 8(B) are drawings showing a fourth preferred embodiment of the driving device.
Figure 8B:
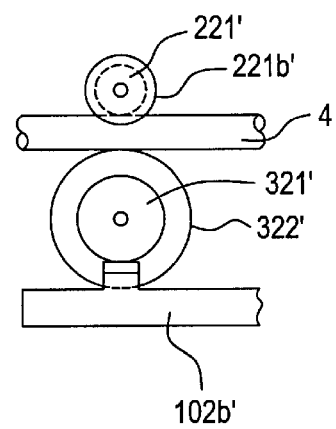

FIGS. 8(A) and 8(B) show a fourth preferred embodiment of a drive device, where FIG. 8(A) is a front view and FIG. 8(B) is a side view. In this embodiment, the outer diameter of a connecting axis part 322' of a lower section roller 321' is formed as a large wheel having a larger size than a second lower roller section 321'. The differential sizes of the sections increase the driving speed of the linear moving element 4. The lower section roller 321' does not include a groove part and thus is not required to control horizontal sliding of the linear moving element 4. However, sections 221a' and 221b' of the upper section roller 221' are placed at edge sections to control horizontal sliding, as seen in FIG. 8(A) to control horizontal sliding. Further, it is possible to have the connecting axis 322' driven by an appropriate drive source (not shown). Alternatively, the vibration actuator can be self-propelled.

Figure 9A:
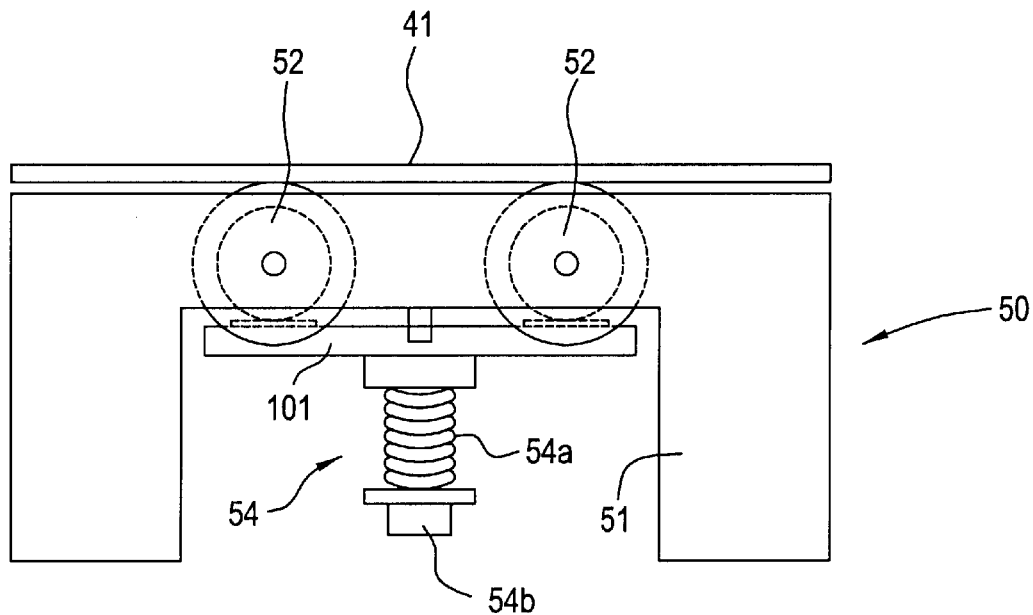
FIGS. 9(A) and 9(C) are drawings showing a fifth preferred embodiment of the driving device.
Figure 9B:
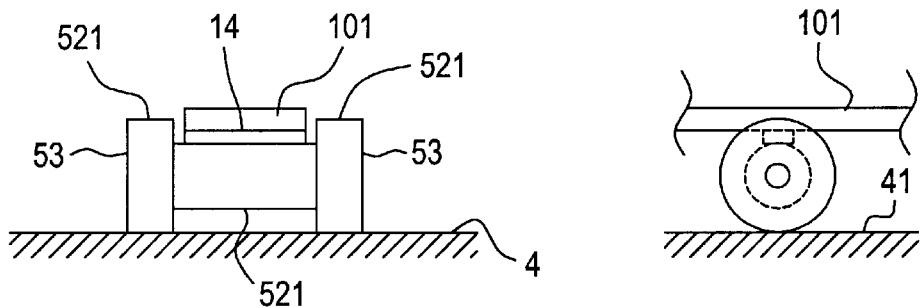
Figure 9C:
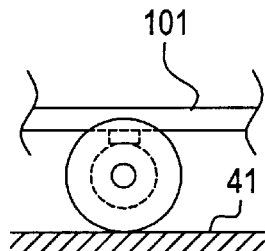

FIGS. 9(A)–9(C) shows a fifth preferred embodiment of the driving device using a vibration actuator according to the invention. FIG. 9(A) is an overall view, FIG. 9(B) is a side view and FIG. 9(C) is a front view with the roller section enlarged.

The driving device of the fifth preferred embodiment includes a vibration actuator 101 and a roller block 50. A roller 52 is freely rotating in a frame member 51 of the roller block 50. A wheel 53 is connected to the roller 52. The wheel 53 has a diameter larger than the diameter of the roller 52. The outer circumference of the wheel 53 is in contact with a sheet-like moving element 41 and an outer circumference of the roller 52 is in contact with the vibration actuator 101. The wheel 53 separates surface 521, which contacts the sheet-like moving element 41, and surface 522, which contacts the driving sections.

The vibration actuator 101 may require additional pressure applied to the roller 52, while contacting the sheet-like moving element. Thus, a pressure adding element 54 is supported by the frame member 51 and contacts the vibration actuator 101. The pressure adding element 54 comprises a coil spring 54*a* and an adjusting screw 54*b*.

As shown in FIG. 9(A), the drive device a sheet-like moving element 41, such as paper, cards or the like, which contacts the roller 52. Alternatively, if the drive device is, as shown in FIGS. 9(B) and 9(C), the linear moving element 41 may serve as a "road" surface. Thus, it is possible to have the drive device move itself.

Figure 10A:
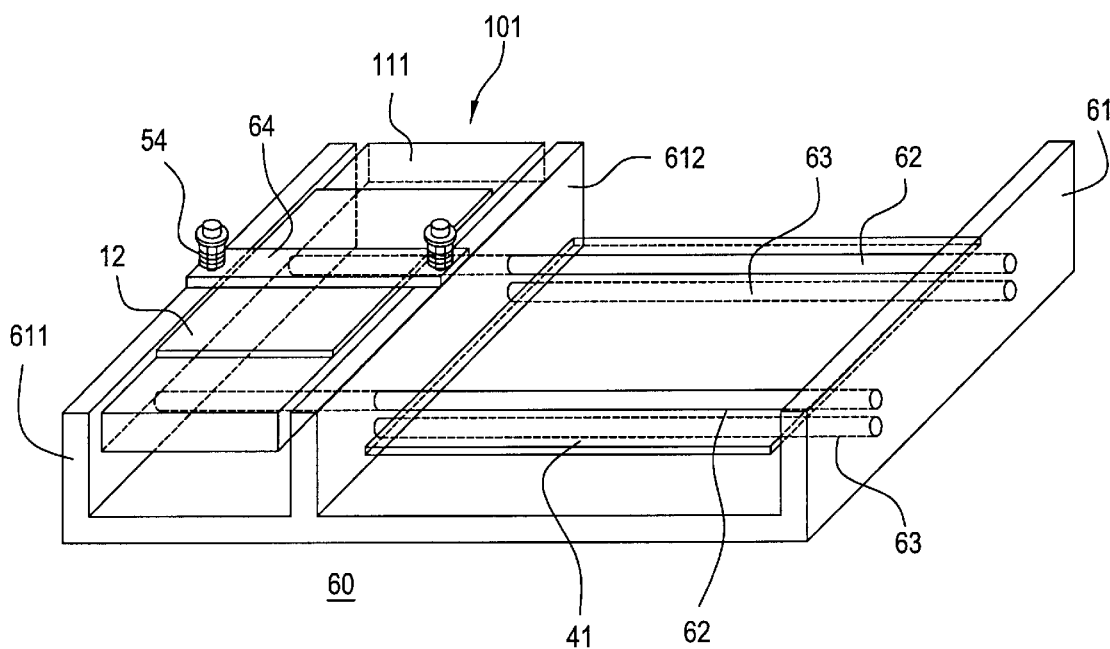
FIGS. 10(A) and 10(B) are drawings showing a sheet type element transfer device according to a sixth preferred embodiment of the driving device.
Figure 10B:
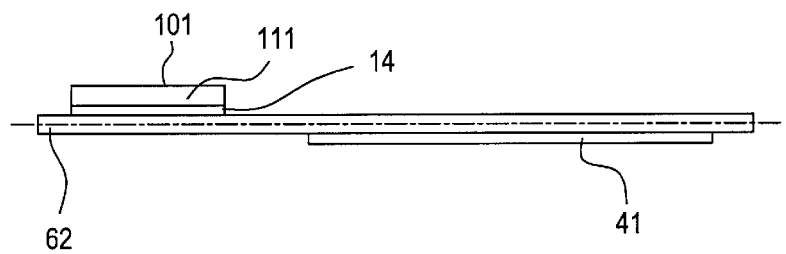
Figure 11:
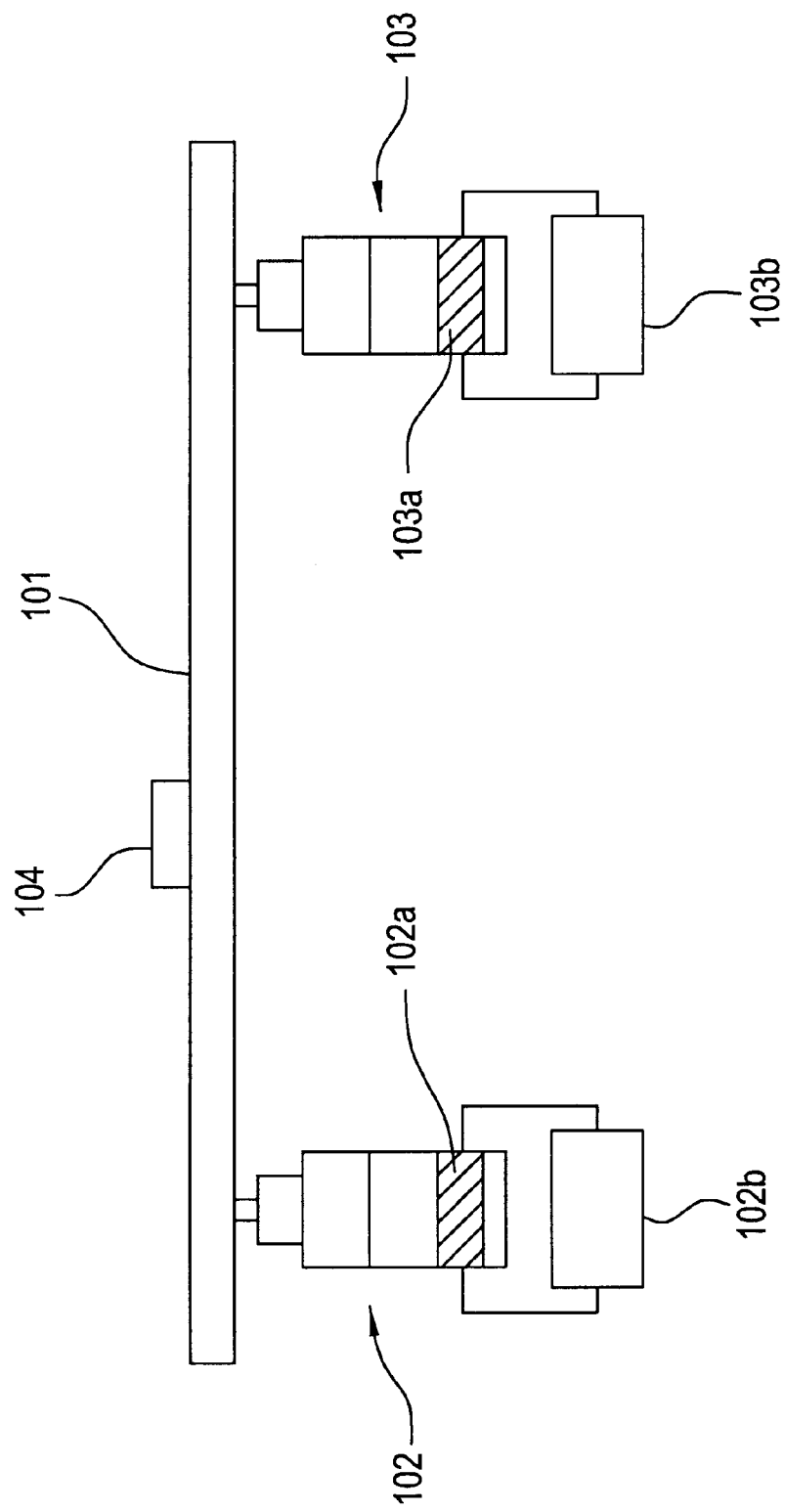
FIG. 11 is a drawing showing a known linear type vibration actuator.
Figure 12B:
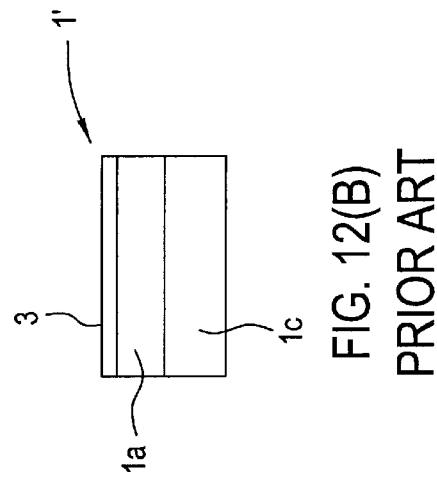
FIGS. 12(A) and 12(C) are drawings showing a known longitudinal L1- bending B4 mode flat-plate motor.
Figure 12C:
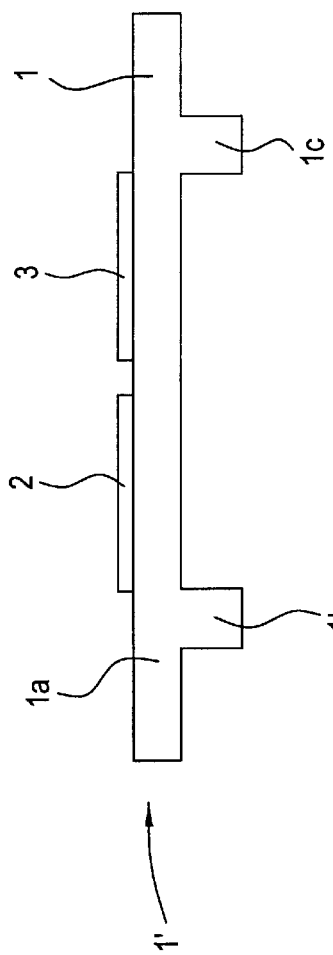
Figure 12A:
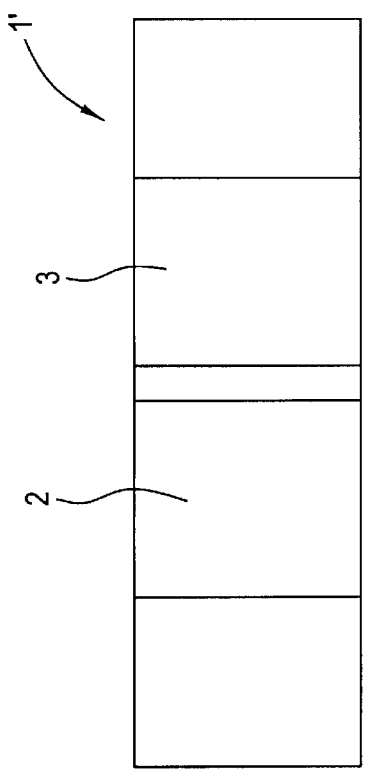

FIG. 10 shows a sheet type element transfer device according to a sixth preferred embodiment. FIG. 10(A) shows the overall drive device, FIG. 10(B) is a front view showing the vibration actuator and the roller element in an enlarged fashion.

The sheet type element transfer device according to the sixth preferred embodiment comprises a vibration actuator 101 that is formed according to the second preferred embodiment. It includes a drive roller 62 and a base 60. The base 60 includes supporting sections 611, 612 and 613 that rotatably support the driving roller 62 on the base 60. The drive roller 62 contacts the vibration actuator 101 between the supporting sections 611 and 612. Additionally, the drive roller 62 contacts a sheet-like moving element 41 at a position between the supporting sections 612 and 613. Further, a guide roller 63 is placed generally parallel to the driving roller 62 and positioned between the supporting sections 612 and 613. The guide roller 63 positions the sheet-like element 41 between it and the driving roller 62.

The vibration actuator 101, as previously described, includes the elastic member 111, piezoelectric elements 12*a*–12*d* connected to the elastic member 111, and the low friction sliding material 14.

A plate element 64 is provided for adding pressure to the drive device. The plate element 64 is placed between the supporting sections 612 and 613 of the drive roller 62. The vibration actuator 101 contacts the drive roller 62 since it is under pressure by the pressure adding element 64 to which the piezoelectric members 12 are attached. Further, the vibration actuator 101 is supported on the base 60 by appropriate fastening device (not shown). The pressure adding element 64 is similar to that shown in FIG. 9, and can include a coil 54*a* and adjusting screw 54*b*.

In the sixth preferred embodiment described above, as in the first embodiment, when the current voltage, which is in a phase differing by 90°, is added to the piezoelectric elements, bending and longitudinal vibrations occur in the elastic member 111. Thus, an elliptic motion is created on the surface of the low friction sliding material 14, which is attached to the elastic member in the general location of the bending vibration antinode. Thus, the driving roller 62, which contacts the sliding material 14 of the elastic member, is rotated. The sheet type element 41 is then moved. When it is desirable to reverse the transfer direction, the phase voltages A and phase voltage B must be reversed and added to the piezoelectric element 12.

The present invention is not limited to the preferred embodiments as disclosed above. Various alterations and changes are possible. For example, the piezoelectric member 12*g* may be a silver electrode, which short circuits with the elastic member 11 using the conducting coating material 13. However, it is possible to use a metal foil, instead of the piezoelectric member 12*g*, and achieve similar results.

The piezoelectric members are described above as electro-mechanical converting elements or mechano-electric converting elements. However, an electrostriction element or the magnetostriction element can also be used in place of the electro-mechanical or mechano-electric converting elements. Additionally, the vibration actuator is described with combined longitudinal and bending vibrations. Moreover, a vibration actuator may be used.

Further, it is possible to improve the durability of the roller by using the same material of the upper section roller for the material for the lower section roller.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A drive device for moving at least one element, the drive device comprising:

a vibration actuator assembly comprising a vibration actuator and a rotatable roller element, the vibration actuator comprising an elastic member having at least one driving section and at least one electro-mechanical converting element that generates an ellipsoidal vibration occurring on a plane in the at least one driving section of the elastic member;

the roller element comprising a first part contacting the at least one driving section of the elastic member and a second part separate from the first part contacting the at least one element, the second part of the roller element having a diameter that is different from a diameter of the first part of the roller element;

wherein the at least one electro-mechanical converting element vibrates the at least one driving section of the elastic member, the at least one driving section transfers the vibration to the first part of the roller element to rotate the roller element and the at least one element is moved linearly by rotation of the second part of the roller element.

2. The drive device according to claim 1, wherein the first part and the second part of the roller element are located on different surfaces of the roller element.

3. The drive device according to claim 1, wherein the second part of the roller element has a diameter that is smaller than a diameter of the first part, and the second part of the roller element is formed in a generally grooved shape.

4. The drive device according to claim 1, wherein the second part in the roller element has a diameter that is larger than the diameter of the first part.

5. The drive device according to claim 4, wherein the second part of the roller element is defined at opposing sides of the first part of the roller element, and the vibration actuator is placed between the second parts.

6. The drive device according to claim 1, wherein a surface roughness of the second part of the roller element that is in contact with the at least one element differs from the surface roughness of the first part of the roller element that is in contact with the at least one driving section of the vibration actuator.

7. The drive device according to claim 6, wherein the surface of the second part is rougher than the surface of the first part.

8. The drive device according to claim 1, wherein a coefficient of friction for the second part of the roller element that is in contact with the at least one element differs from a coefficient of friction of the first part of the roller element that is in contact with the at least one driving section.

9. The drive device according to claim 8, wherein the coefficient of friction of the second part is larger than the coefficient of friction of the first part.

10. The drive device according to claim 9, wherein the first part of the roller element is formed from a metallic material and the at least one driving section of the vibration actuator is formed from one of a composite material and ceramic.

11. The drive device according to claim 10, wherein the composite material contains at least one material selected from the group consisting of: polyoxymethylene; polyphenylene sulfide; polytetrafluoroethylene; polyetheretherketone; and nylon.

12. The drive device according to claim 9, wherein a surface of the second part of the roller element is formed of a composite material, wherein the composite material contains at least one material selected from a group consisting of: a rubber material; polyoxymethylene; polyphenylene sulfide; polytetrafluoroethylene; polyetheretherketone; nylon; urethan resin; phenolic resin; polycarbonate; and bismaleimide triazine.

13. The drive device according to claim 9, wherein the second part of the roller element is formed from polymeric materials, and a surface of the at least one element contacting the second part of the roller element is formed from a composite material, the composite material contains at least one material selected from the group consisting of: a rubber material; polyoxymethylene; polyphenylene sulfide; polytetrafluoroethylene; polyetheretherketone; nylon; urethan resin; phenolic resin; polycarbonate; and bismaleimide triazine.

14. The drive device according to claim 9, wherein a surface of the second part of the roller element is formed from a material selected from a group consisting of: a rubber material; polytetrafluoroethylene; polyamide; polyimide; polyoxymethylene; polyphenylene sulfide; polyetheretherketone; urethan resin; phenolic resin; and bismaleimide triazine.

15. The drive device according to claim 1, wherein the material that forms the first part of the roller element contacting the at least one driving section differs from the material that forms the second part of the roller element contacting the at least one element.

16. The drive device according to claim 15, wherein the at least one driving section is formed of a metallic material and the first part of the roller element is formed from one of a composite material and ceramic.

17. The drive device containing the vibration actuator according to claim 14, wherein the composite material contains at least one material selected from the group consisting of: polyoxymethylene; polyphenylene sulfide; polytetrafluoroethylene; polyetheretherketone; and nylon.

18. The drive device according to claim 1, wherein the at least one electro-mechanical converting element generates longitudinal and bending vibrations that are transferred to the elastic member.

19. The drive device according to claim 1, wherein the elastic member is disposed between the roller element and the electro-mechanical converting element.

20. The drive device according to claim 1, wherein the at least one element is a sheet-like element.

21. The drive device according to claim 1, wherein the at least one element is a fiber-like element.

22. The device according to claim 1, wherein the elastic member is substantially flat with a first flat surface and an opposite second flat surface.

23. The drive device according to claim 22, wherein the at least one electro-mechanical converting element is connected to one of the first and second flat surfaces and a remaining one of the first and second flat surfaces faces the roller element.

24. The drive device according to claim 23, wherein the at least one driving section is connected to the remaining one of the first and second flat surfaces.

25. A drive device for moving at least one element, the drive device comprising:

a vibration actuator assembly comprising a vibration actuator and a rotatable roller element, the vibration actuator comprising an elastic member having at least one driving section and at least one electro-mechanical converting element that generates an ellipsoidal vibration occurring on a plane in the at least one driving section of the elastic member;

the roller element comprising a first part contacting that at least one driving section of the elastic member and a second part separate from the first part contacting the at least one element wherein, the roller element is a first roller element, further comprising a holding element and the at least one element is held by the holding element and the second part of the first roller element;

wherein the at least one electro-mechanical converting element vibrates the at least one driving section of the elastic member, the at least one driving section transfers the vibration to the first part of the roller element to rotate the roller element and the at least one element is moved linearly by rotation of the second part of the roller element.

26. The drive device according to claim 25, wherein the holding element is formed from the same material as the first roller element.

27. A drive device according to claim 25, wherein the holding element is a roller element.

28. A drive device for moving at least one element, the drive device comprising:

a vibration actuator assembly comprising a vibration actuator and a rotatable roller element, the vibration actuator comprising an elastic member having at least one driving section and at least one electro-mechanical converting element that generates an ellipsoidal vibration occurring on a plane in the at least one driving section of the elastic member;

the roller element comprising a first part contacting that at least one driving section of the elastic member and a second part separate from the first part contacting the at least one element, the first part of the roller element being located at both sides of the second part of the roller element, and the vibration actuator being located at the first part;

wherein the at least one electro-mechanical converting element vibrates the at least one driving section of the elastic member, the at least one driving section transfers the vibration to the first part of the roller element to rotate the roller element and the at least one element is moved linearly by rotation of the second part of the roller element.

29. A vibration actuator, comprising:

a base member extending along a longitudinal axis and a central axis disposed perpendicularly to the longitudinal axis and having a first surface and a second surface disposed opposite the first surface;

a pair of inner electro-mechanical converting elements connected to the first surface, respective ones of the pair of inner electro-mechanical converting elements disposed opposite one another relative to the central axis and operative for converting electrical signals into mechanical movement;

a pair of outer electro-mechanical converting elements connected to the first surface, respective ones of the pair of outer electro-mechanical converting elements disposed opposite one another relative to the central axis with the pair of inner electro-mechanical converting elements disposed therebetween and operative for converting mechanical movement to electrical signals;

a pair of contact members connected to the second surface, respective ones of the contact members extending in a direction parallel to the central axis and disposed opposite one another relative to the central axis; and a controller device operative to maintain vibrational amplitude of the vibraton actuator by providing controlled electrical signals to the pair of inner electro-mechanical converting elements based upon the electrical signals received by the controller device from the pair of outer electro-mechanical converting elements.

30. A vibration actuator according to claim 29, wherein the base member includes a pair of driving sections connected to the second surface, each driving section projecting outwardly from the second surface and extending in the direction parallel to the central axis, respective ones of the driving sections disposed opposite one another relative to the central axis wherein respective ones of the contact members are connected to respective ones of the driving sections.

31. A vibration actuator according to claim 29, further comprising:

a central electro-mechanical converting element connected to the second surface and extending along and straddling the central axis; and a conductive member connected to the central electro-mechanical converting element and the base member wherein the conductive member extends into the base member from the second surface.

32. A drive device for moving at least one element, the drive device comprising:

a vibration actuator assembly comprising a vibration actuator and a rotatable roller element, the vibration actuator comprising a vibration element having at least one driving section and at least one electro-mechanical converting element that generates an ellipsoidal vibration occurring on a plane in the at least one driving section of the vibration element, the roller element comprising a first part contacting the at least one driving section of the vibration element and a second part separate from the first part contacting the at least one element, the second part of the roller element having a diameter that is different from a diameter of the first part of the roller element;

wherein the at least one electro-mechanical converting element vibrates the at least one driving section of the vibration element, the at least one driving section transfers the vibration to the first part of the roller element to rotate the roller element and the at least one element is moved linearly by rotation of the second part of the roller element.

33. A drive device for moving at least one element, the drive device comprising:

a vibration actuator assembly comprising a vibration actuator and a rotatable roller element, the vibration actuator comprising a vibration element having at least one driving section and at least one electro-mechanical converting element that generates an ellipsoidal vibration occurring on a plane in the at least one driving section of the vibration element;

the roller element comprising a first part contacting the at least one driving section of the vibration element and a second part separate from the first part contacting the at least one element, the first part of the roller element being located at both sides of the second part of the roller element, and the vibration actuator being located at the first part;

wherein the at least one electro-mechanical converting element vibrates the at least one driving section of the vibration element, the at least one driving section transfers the vibration to the first part of the roller element to rotate the roller element and the at least one element is moved linearly by rotation of the second part of the roller element.

34. A drive device for moving at least one element, the drive device comprising:

a vibration actuator assembly comprising a vibration actuator and a rotatable roller element, the vibration actuator comprising a vibration element having at least one driving section and at least one electro-mechanical converting element that generates an ellipsoidal vibration occurring on a plane in the at least one driving section of the vibration element, the roller element comprising a first part contacting the at least one driving section of the vibration element and a second part separate from the first part contacting the at least one element wherein, the roller element is a first roller element, further comprising a holding element and the at least one element is held by the holding element and the second part of the first roller element;

wherein the at least one electro-mechanical converting element vibrates the at least one driving section of the vibration element, the at least one driving section transfers the vibration to the first part of the roller element to rotate the roller element and the at least one element is moved linearly by rotation of the second part of the roller element.

* * * * *